United States Patent
Wynn et al.

(10) Patent No.: US 11,221,842 B2
(45) Date of Patent: Jan. 11, 2022

(54) SYSTEMS AND METHODS FOR EXECUTING AND VERIFYING SYSTEM FIRMWARE UPDATE BEFORE COMMITTING FIRMWARE UPDATE TO MOTHERBOARD

(71) Applicant: Dell Products L.P., Round Rock, TX (US)

(72) Inventors: Allen C. Wynn, Round Rock, TX (US); Ibrahim Sayyed, Georgetown, TX (US); Carl C. McAdams, Round Rock, TX (US); Gregory A. Havenga, Lakeway, TX (US); Ruhull A. Bhuiyan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 16/857,526

(22) Filed: Apr. 24, 2020

(65) Prior Publication Data

US 2021/0334087 A1    Oct. 28, 2021

(51) Int. Cl.
| | |
|---|---|
| *G06F 9/44* | (2018.01) |
| *G06F 8/654* | (2018.01) |
| *G06F 8/61* | (2018.01) |
| *G06F 21/57* | (2013.01) |
| *G06F 1/24* | (2006.01) |
| *G06F 11/36* | (2006.01) |

(52) U.S. Cl.
CPC ............... *G06F 8/654* (2018.02); *G06F 1/24* (2013.01); *G06F 8/63* (2013.01); *G06F 11/366* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 8,868,796 B1 * | 10/2014 | Wojcik | G06F 8/65 710/8 |
| 9,519,786 B1 * | 12/2016 | Laredo | G06F 8/654 |
| 2003/0154471 A1 * | 8/2003 | Teachman | G06F 8/65 717/171 |
| 2011/0179195 A1 * | 7/2011 | O'Mullan | G06F 8/65 717/168 |
| 2012/0060151 A1 * | 3/2012 | Oh | G06F 8/654 717/170 |

* cited by examiner

*Primary Examiner* — Qamrun Nahar
(74) *Attorney, Agent, or Firm* — Jackson Walker L.L.P.

(57) ABSTRACT

A method may include, during a boot of an information handling system: determining, based on settings stored in non-volatile memory of the information handling system, whether to perform pre-commit execution of a firmware update image prior to committing the firmware update image to a motherboard of the information handling system, and responsive to determining to perform pre-commit execution, load the firmware update image from a basic input/output system partition of a storage resource of the information handling system and execute the firmware update image in lieu of a firmware image stored on the motherboard.

21 Claims, 6 Drawing Sheets

SYSTEMS AND METHODS FOR EXECUTING AND VERIFYING SYSTEM FIRMWARE UPDATE BEFORE COMMITTING FIRMWARE UPDATE TO MOTHERBOARD

TECHNICAL FIELD

The present disclosure relates in general to information handling systems, and more particularly to systems and methods for verifying a system firmware update before committing the firmware update to the motherboard.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One critical component for almost every information handling system is its basic input/output system (BIOS). Generally speaking, a BIOS may include a firmware component configured to identify, test, and/or initialize information handling resources of an information handling system and/or initialize interoperation of an information handling system with other information handling systems. In some instances, a BIOS may include a Unified Extensible Firmware Interface (UEFI).

Often, in order to add functionality, patch bugs, and/or improve security, a BIOS update may be provided by a manufacturer or vendor of the information handling system. However, in some instances, a BIOS update may produce unintended side effects when installed on an information handling system that were not detected during testing of the BIOS update. Such side effects may include failure to boot to an operating system, failure of display video, and/or failure of other information handling resources.

SUMMARY

In accordance with the teachings of the present disclosure, the disadvantages and problems associated with existing approaches to minimizing storage media failures in an information handling system may be reduced or eliminated.

In accordance with embodiments of the present disclosure, a method may include, during a boot of an information handling system: determining, based on settings stored in non-volatile memory of the information handling system, whether to perform pre-commit execution of a firmware update image prior to committing the firmware update image to a motherboard of the information handling system, and responsive to determining to perform pre-commit execution, load the firmware update image from a basic input/output system partition of a storage resource of the information handling system and execute the firmware update image in lieu of a firmware image stored on the motherboard.

In accordance with these and other embodiments of the present disclosure, an information handling system may include a processor and a program of instructions embodied in non-transitory computer readable media and configured to, when read and executed by the processor during a boot of the information handling system: determine, based on settings stored in non-volatile memory of the information handling system, whether to perform pre-commit execution of a firmware update image prior to committing the firmware update image to a motherboard of the information handling system, and responsive to determining to perform pre-commit execution, load the firmware update image from a basic input/output system partition of a storage resource of the information handling system and execute the firmware update image in lieu of a firmware image stored on the motherboard.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system during a boot of the information handling system: determine, based on settings stored in non-volatile memory of the information handling system, whether to perform pre-commit execution of a firmware update image prior to committing the firmware update image to a motherboard of the information handling system, and responsive to determining to perform pre-commit execution, load the firmware update image from a basic input/output system partition of a storage resource of the information handling system and execute the firmware update image in lieu of a firmware image stored on the motherboard.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
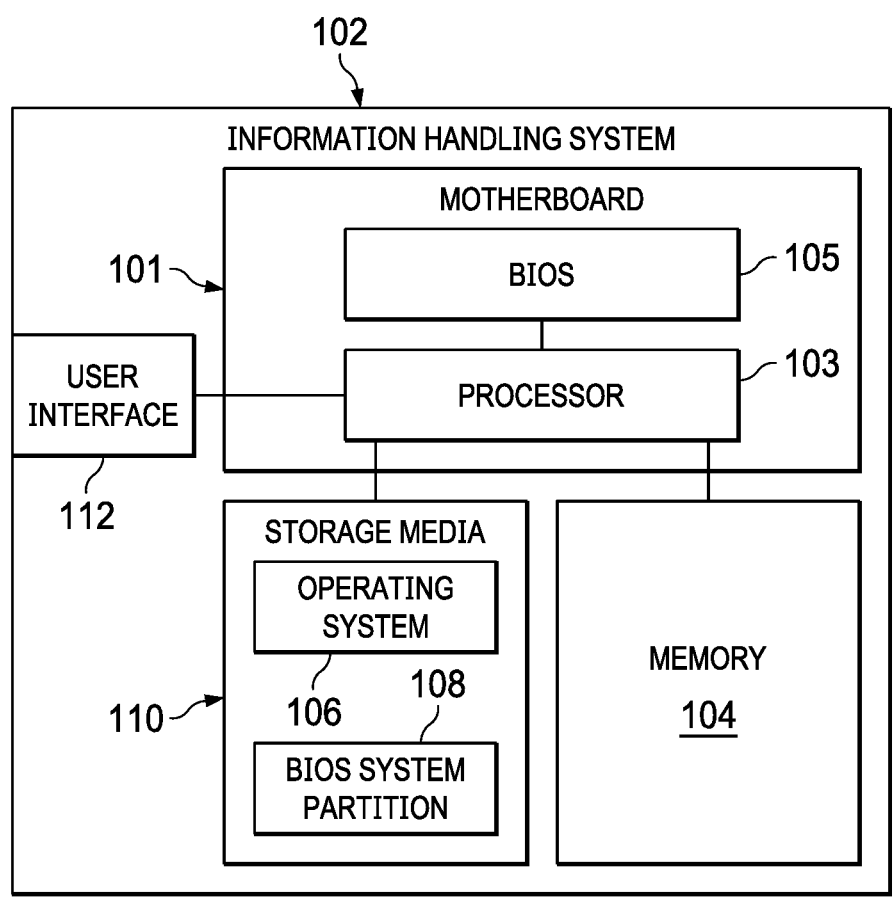
FIG. 1 illustrates a block diagram of an example information handling system, in accordance with embodiments of the present disclosure.

FIG. 1 illustrates a block diagram of an example of an information handling system 102, in accordance with embodiments of the present disclosure. As depicted, information handling system 102 may include a motherboard 101, a memory 104, storage media 110, and a user interface 112.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a BIOS 105, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 110, and/or another component of information handling system 102.

BIOS 105 may be communicatively coupled to processor 103 and may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Although memory 104 is shown external to motherboard 101 in FIG. 1, in some embodiments, memory 104 may reside on motherboard 101.

Storage media 110 may be communicatively coupled to processor 103 and may include any system, device, or apparatus operable to store information processed by processor 103. Storage media 110 may include, for example, a direct access storage device (e.g., a hard disk drive, a solid state drive, etc.)

As shown in FIG. 1, storage media 110 may have stored thereon an operating system 106. Operating system 106 may be any program of executable instructions, or aggregation of programs of executable instructions, configured to manage and/or control the allocation and usage of hardware resources (e.g., processor 103, memory 104, storage media 110, and/or other information handling resources) and provide an interface between such hardware resources and application programs hosted by operating system 106, and thus may act as a host for application programs to be executed by information handling system 102. Active portions of operating system 106 may be loaded into memory 104 and read and executed by processor 103 in order to carry out the functionality of operating system 106. Examples of operating system 106 may include, without limitation, Windows, MacOS, UNIX, LINUX, Android, iOS, or any other closed or open source operating system.

As shown in FIG. 1, storage media 110 may have within a BIOS system partition 108. As is discussed in more detail below, BIOS system partition 108 may be a partition of storage media 110 reserved for use by BIOS. For example, in some embodiments, BIOS system partition 108 may comprise a portion of storage media 110 normally reserved for storing BIOS recovery firmware. In these and other embodiments, BIOS system partition 108 may comprise an Extensible Firmware Interface (EFI) system partition.

User interface 112 may comprise any instrumentality or aggregation of instrumentalities by which a user may interact with information handling system 102. For example, user interface 112 may permit a user to input data and/or instructions into information handling system 102 via one or more input devices (e.g., a keypad, keyboard, touch screen, microphone, and/or other data input device), and/or otherwise manipulate information handling system 102 and its associated components. User interface 112 may also permit information handling system 102 to communicate data to a user via a display device. A display device may comprise any suitable system, device, or apparatus configured to display human-perceptible graphical data and/or alphanumeric data to a user.

In addition to motherboard 101, processor 103, memory 104, BIOS 105, storage media 110, and user interface 112, information handling system 102 may include one or more other information handling resources.

In operation, a BIOS update utility may allow a user to execute an updated BIOS image prior to committing it to motherboard 101, thus allowing a user to ensure that the BIOS update does not have operational defects (e.g., related to the user's environment or configuration) that were not detected during testing of the updated BIOS image. Further, in some cases, such pre-commit execution may include the ability to execute embedded diagnostics to ensure that all information handling resources of information handling system 102 continue to execute properly during execution of the updated BIOS image.

In some embodiments, when a user executes the BIOS firmware update utility (which may execute on processor 103), it may provide the option (e.g., via user interface 112) to perform the pre-commit execution of the BIOS update image, as well as the option to run embedded diagnostics against the BIOS update image. If the user does not select either option, then the BIOS update may occur normally, with the BIOS image committed to motherboard 101.

If the user selects to perform the pre-commit execution of the BIOS update image, the BIOS firmware update utility may set new persistent settings in a non-volatile memory (e.g., non-volatile random access memory, or other non-volatile memory, that may be within memory 104) indicating the user's selection. Responsive to such selection, the BIOS firmware update utility may perform initial steps of the update process, but instead of writing the BIOS update image to motherboard 101 (e.g., to a serial peripheral interface) as occurs during a "normal" BIOS update, the BIOS update image may be written to BIOS system partition 108. A persistent setting in non-volatile memory may be set indicating the pre-commit execution/verification is to be performed, and information handling system 102 may be reset.

Early in the boot process after such reset (e.g., when firmware of information handling system checks to see if BIOS recovery is required), system firmware (e.g., existing BIOS 105 stored on motherboard 101) may check for settings stored in non-volatile memory to determine if the pre-commit execution/verification is to be performed. If so, system firmware may cause the BIOS update image stored in BIOS system partition 108 to load and execute. If no new BIOS image is found at BIOS system partition 108, an error message may be displayed (e.g., to user interface 112).

If settings in non-volatile memory indicate that the user had selected to run embedded diagnostics while the system is in pre-commit execution mode, then the new BIOS update image, now executing, may automatically boot into embedded diagnostics which may run one or more diagnostic tests and report successes and/or failures of the relevant tests. The new BIOS update image may report an errors (e.g., via user interface 112) to the user, and provide the user an option to proceed with the new BIOS update image or to abort the update. If the user selects to abort the update, then the relevant settings in non-volatile memory may be cleared, the BIOS update image may be erased from BIOS system partition 108, and information handling system 102 may reboot to use the existing BIOS image stored on motherboard 101. If there are no errors (or no new errors) or if the user has decided to proceed with errors reported, then relevant settings (indicating to execute embedded diagnostics in the pre-commit execution mode) may be cleared and information handling system 102 may proceed to boot to operating system 106.

If, instead, the settings in non-volatile memory do not indicate that the user had selected to execute embedded diagnostics while the system is in pre-commit execution mode, then information handling system 102 may boot to operating system 106.

Once information handling system 102 has booted to operating system 106, the executing BIOS update image may display a message (e.g., via user interface 112) indicating to the user that execution is being performed in the pre-commit execution/verification mode and that the user may need to complete a process to commit the BIOS update image onto motherboard 101.

Alternately, instead of communicating such a message during operating system execution, in some embodiments a notification may be presented during power-on self-test of information handling system 102, and execution of information handling system 102 may pause and wait for the user to indicate via user interface 112 whether to complete the pre-commit process or to boot again in the pre-commit execution mode.

Once the user has decided to complete the pre-commit process, information handling system 102 may reboot, and the BIOS update image may be read from BIOS system partition 108 and committed to motherboard 101.

Functionality an execution of the pre-commit execution mode is further illustrated below in FIGS. 2-5 and the descriptions thereof.

Figure 2:
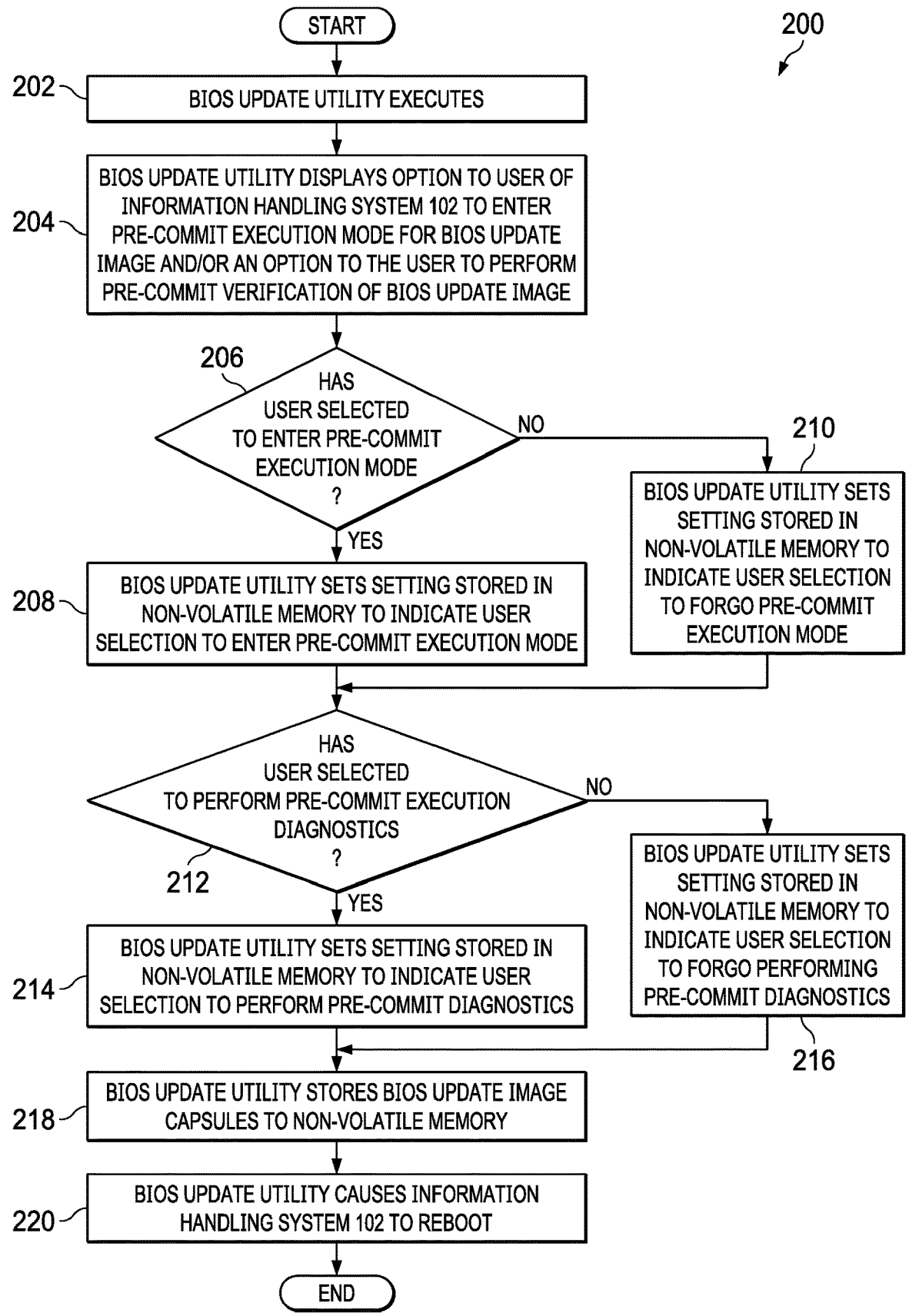
FIG. 2 illustrates a flow chart of an example method that may occur during execution of a BIOS update utility, in accordance with embodiments of the present disclosure.

FIG. 2 illustrates a flow chart of an example method 200 that may occur during execution of a BIOS update utility, in accordance with embodiments of the present disclosure.

According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a BIOS update utility may execute. At step 204, during such execution, the BIOS update utility may display (e.g., via user interface 112) an option to a user of information handling system 102 to enter a pre-commit execution mode for the BIOS update image and/or an option to the user to perform pre-commit verification of the BIOS update image.

At step 206, the BIOS update utility may determine if the user has selected to enter the pre-commit execution mode. If the user has selected to enter the pre-commit execution mode, method 200 may proceed to step 208. Otherwise, method 200 may proceed to step 210.

At step 208, responsive to a user selection to enter the pre-commit execution mode, the BIOS update utility may set a setting stored in non-volatile memory to indicate the user selection to enter the pre-commit execution mode. After completion of step 208, method 200 may proceed to step 212.

At step 210, responsive to a user selection to forgo the pre-commit execution mode, the BIOS update utility may set a setting stored in non-volatile memory to indicate the user selection to forgo the pre-commit execution mode.

At step 212, the BIOS update utility may determine if the user has selected to perform pre-commit diagnostics of the BIOS update image. If the user has selected to perform pre-commit verification, method 200 may proceed to step 214. Otherwise, method 200 may proceed to step 216.

At step 214, responsive to a user selection to perform pre-commit diagnostics of the BIOS update image, the BIOS update utility may set a setting stored in non-volatile memory to indicate the user selection to perform pre-commit diagnostics of the BIOS update image. After completion of step 214, method 200 may proceed to step 218.

At step 216, responsive to a user selection to forgo pre-commit diagnostics of the BIOS update image, the BIOS update utility may set a setting stored in non-volatile memory to indicate the user selection to forgo pre-commit diagnostics of the BIOS update image.

At step 218, the BIOS update utility may store BIOS update image capsules to non-volatile memory. At step 220, the BIOS update utility may cause information handling system 102 to reboot. After completion of step 220, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
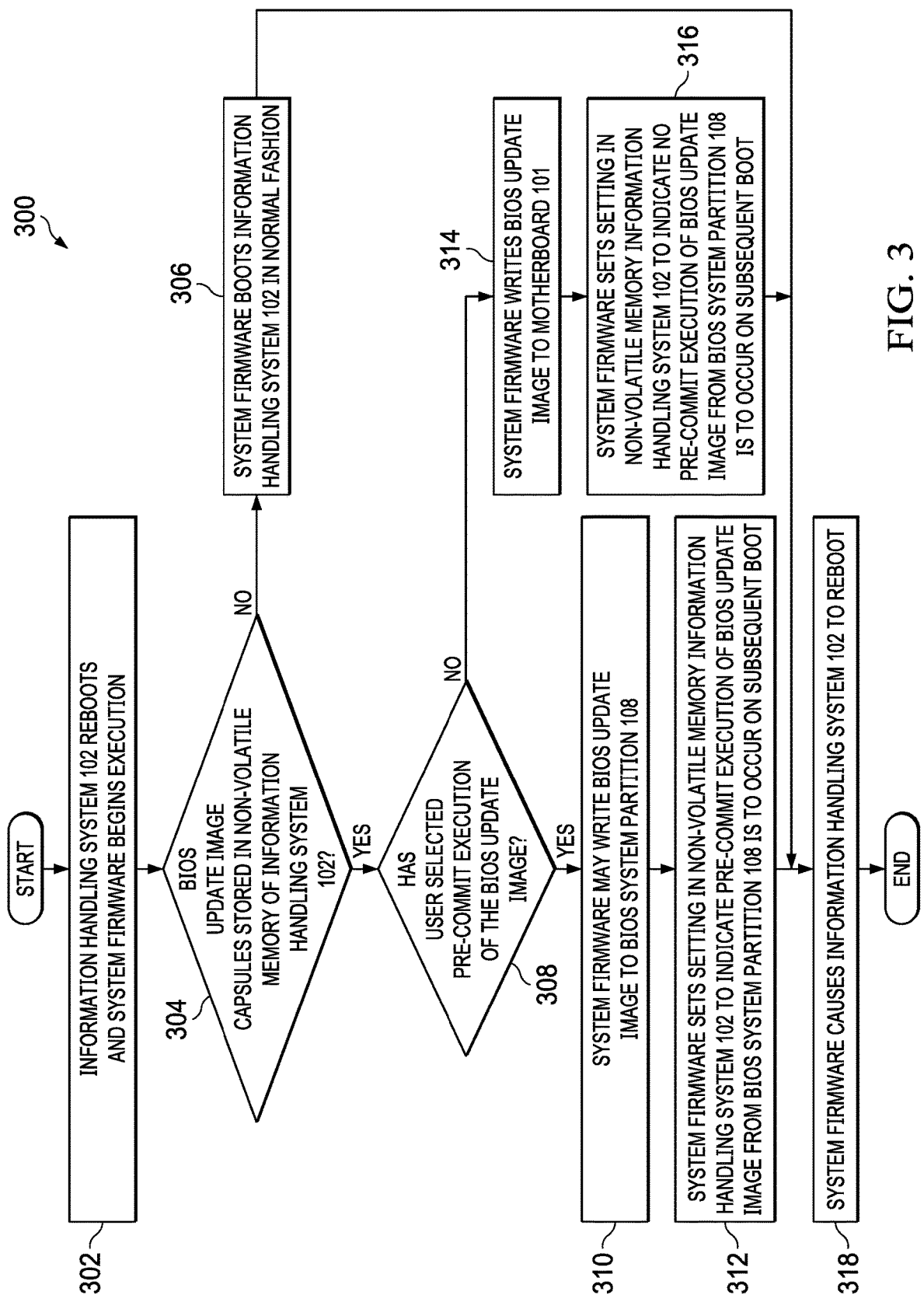
FIG. 3 illustrates a flow chart of an example method that may be performed during a boot session following execution of a BIOS update utility, in accordance with embodiments of the present disclosure.

FIG. 3 illustrates a flow chart of an example method 300 that may be performed during a boot session following execution of a BIOS update utility, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, information handling system 102 may reboot and system firmware (e.g., the existing BIOS image on motherboard 101) may begin execution. At step 304, the system firmware may determine if BIOS update image capsules are stored in non-volatile memory of information handling system 102. If no BIOS update image capsules are stored in non-volatile memory of information handling system 102, method 300 may proceed to step 306. Otherwise, method 300 may proceed to step 308.

At step 306, responsive to no BIOS update image capsules being stored in non-volatile memory of information handling system 102, system firmware may proceed to boot information handling system 102 in normal fashion. After completion of step 306, method 300 may end.

At step 308, responsive to BIOS update image capsules being stored in non-volatile memory of information handling system 102, system firmware may determine (e.g., from relevant settings stored in non-volatile memory of information handling system 102) whether a user has selected pre-commit execution of the BIOS update image. If the user has selected pre-commit execution of the BIOS update image, method 300 may proceed to step 310. Otherwise, method 300 may proceed to step 314.

At step 310, responsive to a determination that the user has selected pre-commit execution of the BIOS update image, system firmware may write the BIOS update image to BIOS system partition 108. At step 312, system firmware may set a setting in non-volatile memory of information handling system 102 to indicate pre-commit execution of the BIOS update image from BIOS system partition 108 is to occur on a subsequent boot. After completion of step 312, method 300 may proceed to step 318.

At step 314, responsive to a determination that the user has not selected pre-commit execution of the BIOS update image, system firmware may write the BIOS update image to motherboard 101. At step 316, system firmware may set a setting in non-volatile memory of information handling system 102 to indicate that no pre-commit execution of the BIOS update image from BIOS system partition 108 is to occur on a subsequent boot.

At step 318, system firmware may cause information handling system 102 to reboot. After completion of step 318, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4A:
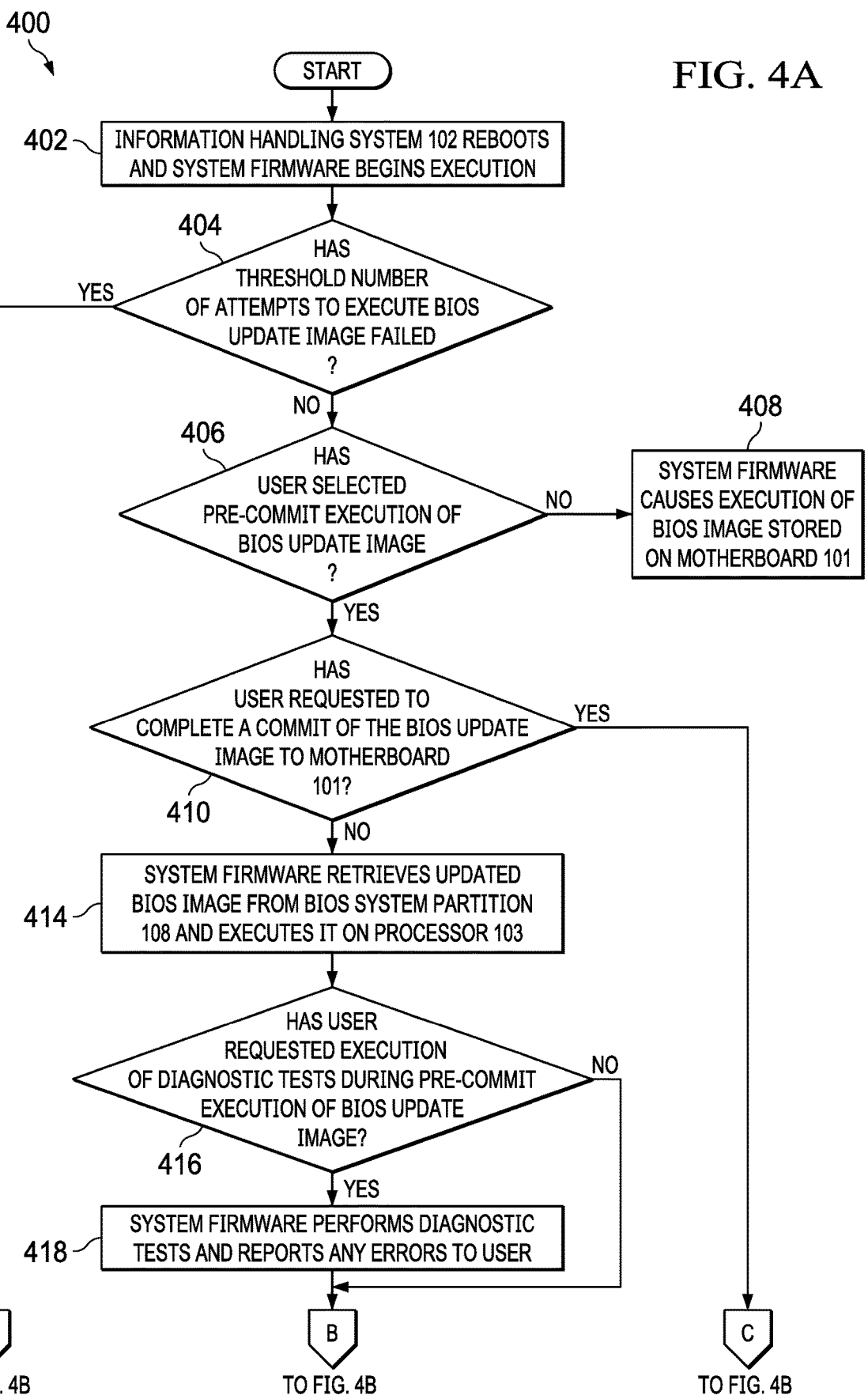
FIGS. 4A and 4B (which may collectively be referred to herein as "FIG. 4) illustrate a flow chart of an example method of a boot process for pre-commit execution of a BIOS update image, in accordance with embodiments of the present disclosure.
Figure 4B:
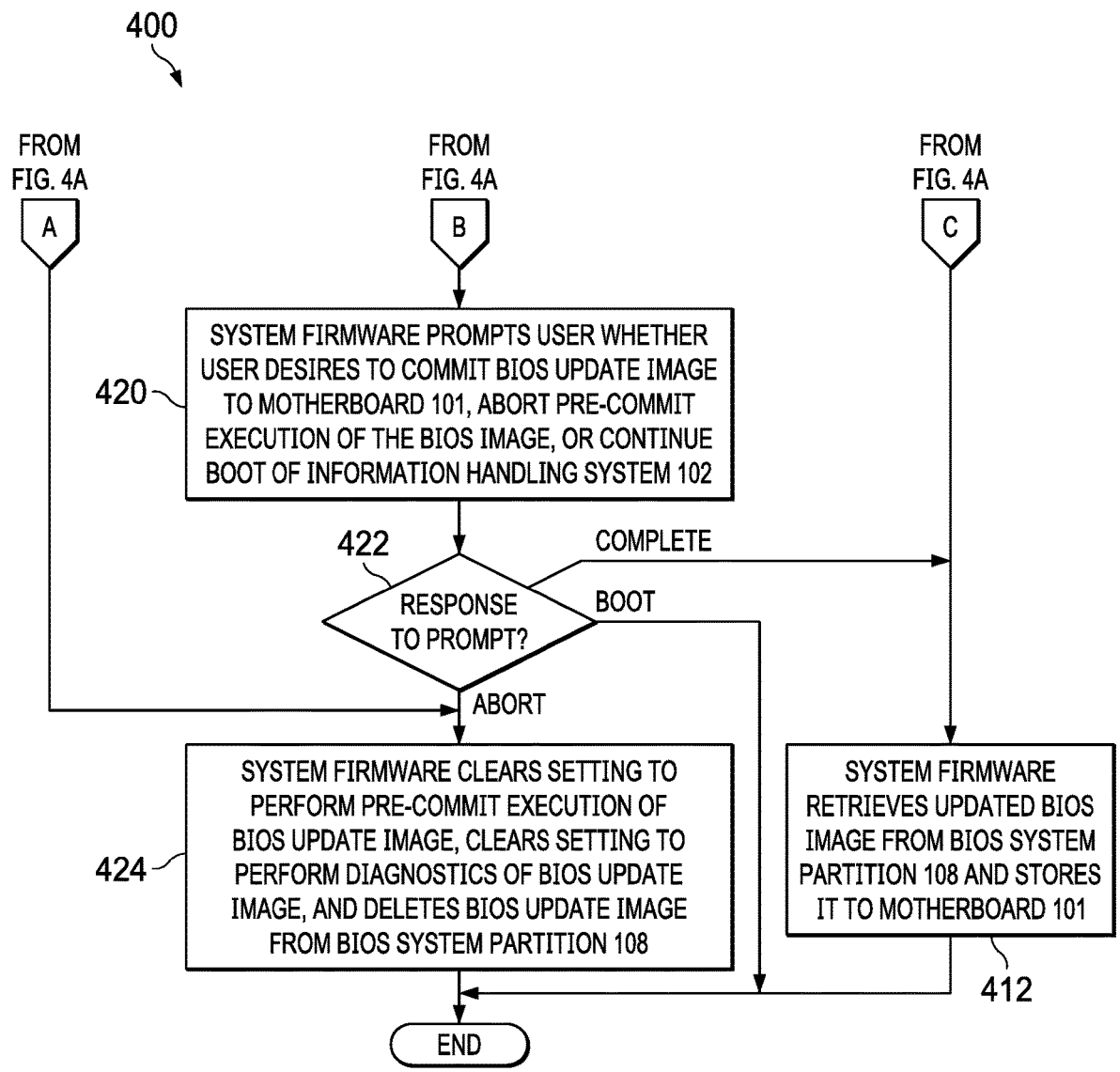

FIG. 4 illustrates a flow chart of an example method 400 of a boot process for pre-commit execution of a BIOS update image, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, information handling system 102 may reboot and system firmware may begin execution. At step 404, the system firmware may determine if a threshold number (e.g., three) of attempts to execute the BIOS update image have failed, which may indicate the BIOS update image causes errors in information handling system 102 (e.g., failure of video or power-on/self-test). If the threshold of attempts to execute system firmware have failed, method 400 may proceed to step 424. Otherwise, method 400 may proceed to step 406.

At step 406, system firmware may determine (e.g., based on settings stored in non-volatile memory of information handling system 102) if a user has (during a previous boot session) selected pre-commit execution of the BIOS update image. If the user has selected pre-commit execution of the BIOS update image, method 400 may proceed to step 410. Otherwise, method 400 may proceed to step 408.

At step 408, the system firmware may cause execution of the BIOS image stored on motherboard 101, and system boot of information handling system 102 may proceed normally. After completion of step 408, method 400 may end.

At step 410, responsive to the user having selected pre-commit execution of the BIOS update image, system firmware may determine (e.g., based on settings stored in non-volatile memory of information handling system 102) if a user has (during a previous boot session) requested to complete a commit of the BIOS update image to motherboard 101. If the user has requested to complete a commit of the BIOS update image to motherboard 101, method 400 may proceed to step 412. Otherwise, method 400 may proceed to step 414.

At step 412, responsive to a user request to complete a commit of the BIOS update image to motherboard 101, system firmware may retrieve the updated BIOS image from BIOS system partition 108 and store it to motherboard 101. After completion of step 412, method 400 may proceed to step 424.

At step 414, system firmware may retrieve the updated BIOS image from BIOS system partition 108 and execute it on processor 103.

At step 416, system firmware may determine whether the user requested execution of diagnostic tests during pre-commit execution of the BIOS update image. If the user requested performance of diagnostic tests during pre-commit execution of the BIOS update image, method 400 may proceed to step 418. Otherwise, method 400 may proceed to step 420.

At step 418, responsive to user request of performance of diagnostic tests during pre-commit execution of the BIOS update image, system firmware may perform the diagnostic tests and report any errors to the user (e.g., via user interface 112).

At step 420, system firmware may prompt the user whether the user desires to commit the BIOS update image to motherboard 101, abort (e.g., due to errors during execution of the BIOS update image) pre-commit execution of the BIOS update image, or continue boot of information handling system 102 (e.g., completion of pre-commit execution of BIOS and loading of operating system 106).

At step 422, system firmware may receive a response to the prompt. If the user desires to commit the BIOS update image to motherboard 101, method 400 may proceed to step 412. If the user desires to abort pre-commit execution of the BIOS update image, method 400 may proceed to step 424. If the user desires to continue boot of information handling system 102, method 400 may proceed to step 408.

At step 424, system firmware may clear the setting to perform pre-commit execution of the BIOS update image, clear the setting to perform diagnostics of the BIOS update image, and delete the BIOS update image from BIOS system partition 108. After completion of step 424, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Figure 5:
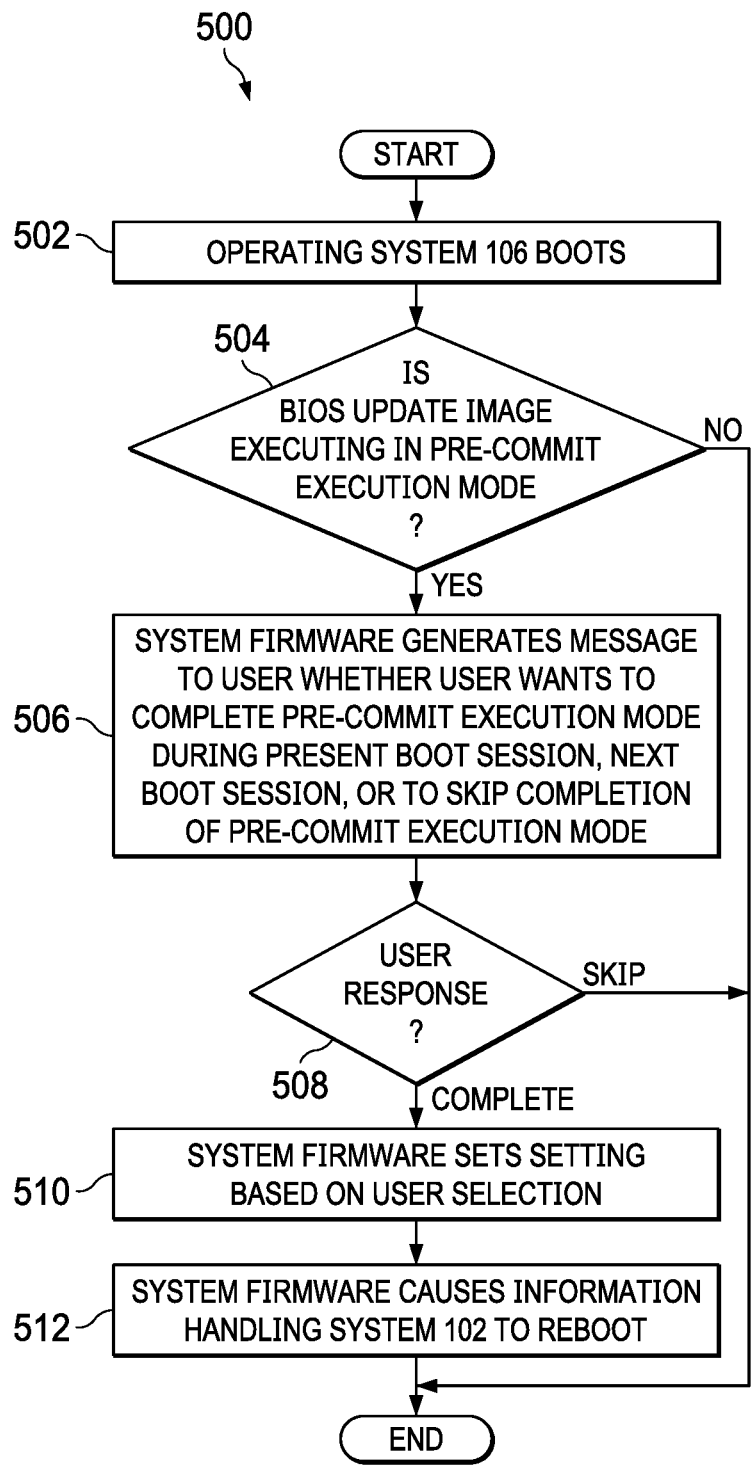
FIG. 5 illustrates a flow chart of an example method for operating system execution when pre-commit execution of a BIOS update image is enabled, in accordance with embodiments of the present disclosure.

FIG. 5 illustrates a flow chart of an example method 500 for operating system execution when pre-commit execution of a BIOS update image is enabled, in accordance with embodiments of the present disclosure. According to some embodiments, method 500 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, operating system 106 may boot. At step 504, system firmware may determine if the BIOS update image is executing in the pre-commit execution mode. If the BIOS update image in executing in the pre-commit execution mode, method 500 may proceed to step 506. Otherwise, method 500 may end and operation of information handling system 102 may proceed in normal fashion.

At step 506, system firmware may generate a message to the user (e.g., via user interface 112) whether the user wants to complete the pre-commit execution mode during the present boot session, the next boot session, or to skip completion of the pre-commit execution mode.

At step 508, system firmware may receive the user's selection. If the user indicates a desire to skip completion of the pre-commit execution mode, method 500 may end and operation of information handling system 102 may proceed in normal fashion. If the user indicates a desire to complete the pre-commit execution mode during the present boot session or the next boot session, method 500 may proceed to step 510.

At step 510, system firmware may set a setting based on the user selection made at step 508. At step 512, system firmware may cause information handling system 102 to reboot. After completion of step 512, method 500 may end.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102 or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, during a boot of an information handling system:
    determining, based on settings stored in non-volatile memory of the information handling system, whether to perform pre-commit execution of a firmware update image prior to committing the firmware update image to a motherboard of the information handling system; and
    responsive to determining to perform pre-commit execution, load the firmware update image from a basic input/output system partition of a storage resource of the information handling system and execute the firmware update image in lieu of a firmware image stored on the motherboard.

2. The method of claim 1, further comprising, responsive to determining not to perform pre-commit execution, loading the firmware image stored on the motherboard and executing the firmware image.

3. The method of claim 1, wherein the firmware update image is an image for updating a basic input/output system of the information handling system.

4. The method of claim 1, wherein the settings are set in response to user selections during a prior boot session of the information handling system.

5. The method of claim 1, further comprising:
    determining, based on the settings, whether to perform diagnostic tests during pre-commit execution; and
    responsive to determining to perform diagnostic tests during pre-commit execution, performing one or more diagnostic tests regarding interoperability of information handling resources of the information handling system with the firmware update image.

6. The method of claim 1, further comprising:
    receiving user input during pre-commit execution regarding a user desire to complete pre-commit execution; and
    responsive to an indication of user desire to complete pre-commit execution:
        committing the firmware update image to the motherboard; and
        causing a reset of the information handling system such that the information handling system boots from the firmware update image as stored to the motherboard on a subsequent boot of the information handling system.

7. The method of claim 1, wherein receiving the user input during pre-commit execution regarding the user desire to complete pre-commit execution occurs during execution of an operating system of the information handling system.

8. An information handling system comprising:
    a processor; and
    a program of instructions embodied in non-transitory computer readable media and configured to, when read and executed by the processor during a boot of the information handling system:
        determine, based on settings stored in non-volatile memory of the information handling system, whether to perform pre-commit execution of a firmware update image prior to committing the firmware update image to a motherboard of the information handling system; and
        responsive to determining to perform pre-commit execution, load the firmware update image from a basic input/output system partition of a storage resource of the information handling system and execute the firmware update image in lieu of a firmware image stored on the motherboard.

9. The information handling system of claim 8, the program instructions further configured to, responsive to determining not to perform pre-commit execution, load the firmware image stored on the motherboard and execute the firmware image.

10. The information handling system of claim 8, wherein the firmware update image is an image for updating a basic input/output system of the information handling system.

11. The information handling system of claim 8, wherein the settings are set in response to user selections during a prior boot session of the information handling system.

12. The information handling system of claim 8, the program instructions further configured to:
   determine, based on the settings, whether to perform diagnostic tests during pre-commit execution; and
   responsive to determining to perform diagnostic tests during pre-commit execution, perform one or more diagnostic tests regarding interoperability of information handling resources of the information handling system with the firmware update image.

13. The information handling system of claim 8, the program instructions further configured to:
   receive user input during pre-commit execution regarding a user desire to complete pre-commit execution; and
   responsive to an indication of user desire to complete pre-commit execution:
      commit the firmware update image to the motherboard; and
      cause a reset of the information handling system such that the information handling system boots from the firmware update image as stored to the motherboard on a subsequent boot of the information handling system.

14. The information handling system of claim 8, wherein receiving the user input during pre-commit execution regarding the user desire to complete pre-commit execution occurs during execution of an operating system of the information handling system.

15. An article of manufacture comprising:
   a non-transitory computer-readable medium; and
   computer-executable instructions carried on the computer-readable medium, the instructions readable by a processor, the instructions, when read and executed, for causing the processor to, in an information handling system during a boot of the information handling system:
      determine, based on settings stored in non-volatile memory of the information handling system, whether to perform pre-commit execution of a firmware update image prior to committing the firmware update image to a motherboard of the information handling system; and
      responsive to determining to perform pre-commit execution, load the firmware update image from a basic input/output system partition of a storage resource of the information handling system and execute the firmware update image in lieu of a firmware image stored on the motherboard.

16. The article of claim 15, the instructions further for causing the processor to, responsive to determining not to perform pre-commit execution, load the firmware image stored on the motherboard and execute the firmware image.

17. The article of claim 15, wherein the firmware update image is an image for updating a basic input/output system of the information handling system.

18. The article of claim 15, wherein the settings are set in response to user selections during a prior boot session of the information handling system.

19. The article of claim 15, the instructions further for causing the processor to:
   determine, based on the settings, whether to perform diagnostic tests during pre-commit execution; and
   responsive to determining to perform diagnostic tests during pre-commit execution, perform one or more diagnostic tests regarding interoperability of information handling resources of the information handling system with the firmware update image.

20. The article of claim 15, the instructions further for causing the processor to:
   receive user input during pre-commit execution regarding a user desire to complete pre-commit execution; and
   responsive to an indication of user desire to complete pre-commit execution:
      commit the firmware update image to the motherboard; and
      cause a reset of the information handling system such that the information handling system boots from the firmware update image as stored to the motherboard on a subsequent boot of the information handling system.

21. The article of claim 15, wherein receiving the user input during pre-commit execution regarding the user desire to complete pre-commit execution occurs during execution of an operating system of the information handling system.

* * * * *